(12) United States Patent
Hua et al.

(10) Patent No.: US 11,314,608 B1
(45) Date of Patent: Apr. 26, 2022

(54) CREATING AND DISTRIBUTING SPARE CAPACITY OF A DISK ARRAY

(71) Applicant: EMC IP HOLDING COMPANY LLC, Hopkinton, MA (US)

(72) Inventors: Kuolin Hua, Natick, MA (US); Kunxiu Gao, Boxborough, MA (US)

(73) Assignee: DELL PRODUCTS L.P., Hopkinton, MA (US)

( * ) Notice: Subject to any disclaimer, the term of this patent is extended or adjusted under 35 U.S.C. 154(b) by 0 days.

(21) Appl. No.: 17/061,922

(22) Filed: Oct. 2, 2020

(51) Int. Cl.
*G06F 11/20* (2006.01)
*G06F 3/06* (2006.01)

(52) U.S. Cl.
CPC ........ *G06F 11/2094* (2013.01); *G06F 3/0619* (2013.01); *G06F 3/0631* (2013.01); *G06F 3/0689* (2013.01); *G06F 2201/85* (2013.01)

(58) Field of Classification Search
CPC ................. G06F 11/2094; G06F 2201/85
See application file for complete search history.

(56) References Cited

U.S. PATENT DOCUMENTS

| | | | | |
|---|---|---|---|---|
| 10,540,103 | B1* | 1/2020 | Gao | G06F 3/0619 |
| 11,144,396 | B1* | 10/2021 | Hua | G06F 11/2094 |
| 2003/0126523 | A1* | 7/2003 | Corbett | G06F 11/1076 |
| | | | | 714/E11.034 |
| 2005/0063217 | A1* | 3/2005 | Shiraishi | G06F 11/1096 |
| | | | | 365/154 |
| 2006/0143379 | A1* | 6/2006 | Khan | G06F 3/0689 |
| | | | | 711/114 |
| 2013/0290626 | A1* | 10/2013 | Sundrani | G06F 11/1096 |
| | | | | 711/114 |
| 2015/0212760 | A1* | 7/2015 | Goel | G06F 3/0605 |
| | | | | 714/6.3 |
| 2020/0310644 | A1* | 10/2020 | Hua | G06F 3/0644 |
| 2020/0326891 | A1* | 10/2020 | Luo | G06F 12/10 |
| 2021/0132843 | A1* | 5/2021 | Shang | G06F 11/3034 |
| 2021/0157488 | A1* | 5/2021 | Shen | G06F 3/0607 |
| 2021/0311654 | A1* | 10/2021 | Wei | G06F 3/0659 |

* cited by examiner

*Primary Examiner* — Matthew M Kim
*Assistant Examiner* — Matthew N Putaraksa
(74) *Attorney, Agent, or Firm* — Anderson Gorecki LLP

(57) ABSTRACT

A subset of drives with protection groups that have D data members and P parity members is created with (W+1) drives each having W partitions where W=(D+P). A single partition protection group is created in the lowest numbered partition of the W lowest numbered drives. Spares are created at drive X partition Y that satisfy X+Y=W+2. Members of additional protection groups with W members are symmetrically distributed on remaining partitions such that the protection group member at drive X partition index Y belongs to protection group N: if (X+Y)<(W+2), then N=(X+Y−2); and if (X+Y)>(W+2), then N=(X+Y−W−2). The spares are used to rebuild partitions in the event of drive failure. When a new drive is added the first W protection group members in the lowest numbered unrotated partition are rotated onto the new drive. The single partition protection group is excluded from rotation. Partitions vacated by rotated protection group members and a rotated spare are used to create a new protection group. The drive subset is split after enough new drives have been added.

20 Claims, 20 Drawing Sheets

Drive Subset 300

| drive\part | 1 | 2 | 3 | 4 |
|---|---|---|---|---|
| 1 | 4 | 1 | 2 | 3 |
| 2 | 4 | 2 | 3 | S |
| 3 | 4 | 3 | S | 1 |
| 4 | 4 | S | 1 | 2 |
| 5 | S | 1 | 2 | 3 |

Figure 4

| drive\part | 1 | 2 | 3 | 4 |
|---|---|---|---|---|
| ~~1~~ | | | | |
| 2 | 4 | 2 | 3 | 1 |
| 3 | 4 | 3 | 2 | 1 |
| 4 | 4 | 3 | 1 | 2 |
| 5 | 4 | 1 | 2 | 3 |

Figure 6

| drive\part | 1 | 2 | 3 | 4 |
|---|---|---|---|---|
| 1 | 4 |   | 2 | 3 |
| 2 | 4 |   | 3 | S |
| 3 | 4 |   | S | 1 |
| 4 | 4 | New S | 1 | 2 |
| 5 | S | 1 | 2 | 3 |
| 6 | 1 | 2 | 3 | S |

Figure 8

| drive\part | 1 | 2 | 3 | 4 |
|---|---|---|---|---|
| 1 | 4 | 5 | 2 | 3 |
| 2 | 4 | 5 | 3 | S |
| 3 | 4 | 5 | S | 1 |
| 4 | 4 | S | 1 | 2 |
| 5 | S | 1 | 2 | 3 |
| 6 | 1 | 2 | 3 | S→5 |

Figure 9

| drive\part | 1 | 2 | 3 | 4 |
|---|---|---|---|---|
| 1 | 4 | 5 | 6 | 3 |
| 2 | 4 | 5 | 6 | S |
| 3 | 4 | 5 | S | 1 |
| 4 | 4 | S | 6 | 2 |
| 5 | S | 1 | 2 | 3 |
| 6 | 1 | 2 | 3 | 5 |
| 7 | 2 | 3 | S→6 | 1 |

Figure 10

| drive\part | 1 | 2 | 3 | 4 |
|---|---|---|---|---|
| 1 | 4 | 5 | 6 | 7 |
| 2 | 4 | 5 | 6 | S |
| 3 | 4 | 5 | S | 7 |
| 4 | 4 | S | 6 | 7 |
| 5 | S | 1 | 2 | 3 |
| 6 | 1 | 2 | 3 | 5 |
| 7 | 2 | 3 | 6 | 1 |
| 8 | 3 | S→7 | 1 | 2 |

Figure 11

| drive\part | 1 | 2 | 3 | 4 |
|---|---|---|---|---|
| 1 | 4 | 5 | 6 | 7 |
| 2 | 4 | 5 | 6 | S |
| 3 | 4 | 5 | S | 7 |
| 4 | 4 | S | 6 | 7 |
| 9 | S | 5 | 6 | 7 |

New Drive Subset 350

| drive\part | 1 | 2 | 3 | 4 |
|---|---|---|---|---|
| 5 | S | 1 | 2 | 3 |
| 6 | 1 | 2 | 3 | S |
| 7 | 2 | 3 | S | 1 |
| 8 | 3 | S | 1 | 2 |

New Drive Subset 352

Figure 13

| drive\part | 1 | 2 | 3 | 4 |
|---|---|---|---|---|
| 5 | 8 | 1 | 2 | 3 |
| 6 | 1 | 2 | 3 | 8 |
| 7 | 2 | 3 | 8 | 1 |
| 8 | 3 | 8 | 1 | 2 |

New Drive Subset 352

Figure 15

| drive\part | 1 | 2 | 3 | 4 |
|---|---|---|---|---|
| 1 | 4 | 5 | 6 | 7 |
| 2 | 4 | 5 | 6 | S |
| 3 | 4 | 5 | S | 7 |
| 4 | 4 | S | 6 | 7 |
| 9 | S | 5 | 6 | 7 |

New Drive Subset 360

| drive\part | 1 | 2 | 3 | 4 |
|---|---|---|---|---|
| 5 | 8 | 1 | 2 | 3 |
| 6 | 8 | 2 | 3 | S |
| 7 | 8 | 3 | S | 1 |
| 8 | 8 | S | 1 | 2 |
| 10 | S | 1 | 2 | 3 |

New Drive Subset 362

Figure 17

| drive\part | 1 | 2 | 3 | 4 |
|---|---|---|---|---|
| 1 | 4 | 5 | 6 | 7 |
| 2 | 4 | 5 | 6 | S→3 |
| 3 | 4 | 5 | S→2 | 7 |
| 4 | 4 | S→1 | 6 | 7 |
| 9 | S→8 | 5 | 6 | 7 |

New Drive Subset 364

| drive\part | 1 | 2 | 3 | 4 |
|---|---|---|---|---|
| ~~5~~ | [8] | [1] | [2] | [3] |
| 6 | 8 | 2 | 3 | 9 |
| 7 | 8 | 3 | 9 | 1 |
| 8 | 8 | 9 | 1 | 2 |
| 10 | 9 | 1 | 2 | 3 |

New Drive Subset 366

Figure 18

CREATING AND DISTRIBUTING SPARE CAPACITY OF A DISK ARRAY

TECHNICAL FIELD

The subject matter of this disclosure is generally related to electronic data storage and more particularly to providing scalable drive subsets with protection groups and spare capacity.

BACKGROUND

Protection groups help to avoid data loss by enabling a failing or failed protection group member to be reconstructed. Individual disk drives are protection group members in a typical data storage system, e.g. members of a redundant array of independent drives (RAID) protection group. A RAID (D+P) protection group has D data members and P parity members. The data members store data. The parity members store parity information such as XORs of data values. The parity information enables reconstruction of data in the event that a data member fails. Parity information can be reconstructed from the data on the data members in the event that a parity member fails. A failed protection group member is typically reconstructed on a spare drive.

It is sometimes necessary to increase the total storage capacity of a data storage system. For example, storage capacity may be increased when existing storage capacity becomes fully utilized. The storage capacity of a data storage system that uses individual drives as protection group members is increased by adding a new protection group, i.e. (W+1) drives for a RAID (D+P) protection group and spare drive where W=(D+P). A storage system that implements RAID-5 (4+1), for example, may be scaled-up in increments of five new drives plus one spare drive. Similarly, a RAID-5 (3+1) may be scaled-up in increments of four new drives plus one spare drive. One drawback of scaling storage capacity in increments of (W+1) new drives is that it may introduce excess storage capacity that will not be utilized within a reasonable timeframe. This drawback is becoming more troublesome as the storage capacity of individual drives increases due to technological advancements. More specifically, as the storage capacity and cost of drives increases, the amount of excess storage capacity and cost associated with adding W+1 drives to a storage system also increases, particularly for larger values of W.

SUMMARY

All examples, aspects and features mentioned in this document can be combined in any technically possible way.

In accordance with some implementations a method of creating and distributing spare capacity on a scalable drive subset on which protection groups are maintained comprises: creating W=(D+P) partitions that are equal in size and number on W+1 drives, wherein the partitions are sequentially ordered, and the drives are sequentially ordered; creating a first vertical protection group that has D data members and P parity members in one partition of W of the drives; creating and distributing W spares at values of drive X, partition Y that satisfy (X+Y)=(W+2); and symmetrically distributing members of additional protection groups with W members on remaining partitions; whereby the spares are distributed such that all protection group members on a failed one of the drives can be relocated to ones of the spares such that no more than one member of any of the protection groups is located on a single one of the drives.

In accordance with some implementations an apparatus comprises: a plurality of non-volatile drives; a plurality of interconnected compute nodes that manage access to the drives; and a drive manager configured to: create W=(D+P) partitions that are equal in size and number on (W+1) drives, wherein the partitions are sequentially ordered, and the drives are sequentially ordered; create a first vertical protection group that has D data members and P parity members in one partition of W of the drives; create and distribute W spares at values of drive X, partition Y that satisfy (X+Y)=(W+2); and symmetrically distribute members of additional protection groups with W members on remaining partitions; whereby the spares are distributed such that all protection group members on a failed one of the drives can be relocated to ones of the spares such that no more than one member of any of the protection groups is located on a single one of the drives.

In accordance with some implementations a computer-readable storage medium stores instructions that when executed by a computer cause the computer to perform a method for using a computer system to create and distribute spare capacity on a scalable drive subset on which protection groups are maintained, the method comprising: creating W=(D+P) partitions that are equal in size and number on (W+1) drives, wherein the partitions are sequentially ordered, and the drives are sequentially ordered; creating a first vertical protection group that has D data members and P parity members in one partition of W of the drives; creating and distributing W spares at values of drive X, partition Y that satisfy (X+Y)=(W+2); and symmetrically distributing members of additional protection groups with W members on remaining partitions; whereby the spares are distributed such that all protection group members on a failed one of the drives can be relocated to ones of the spares such that no more than one member of any of the protection groups is located on a single one of the drives.

BRIEF DESCRIPTION OF THE FIGURES

FIG. 4 is a matrix representation of the drive subset of FIG. 3.

FIGS. 5 and 6 illustrate use of spare partitions in response to drive failure in the drive subset represented by FIG. 4.

FIGS. 7 and 8 illustrate selection and movement of protection group members to a first new drive added to the drive subset represented by FIG. 4.

FIG. 9 illustrates creation of a new protection group using the partitions freed by movement of existing protection group members to the first new drive.

FIG. 10 illustrates selection and movement of protection group members to a second new drive added to the drive subset and creation of a new protection group using the partitions freed by movement of existing protection group members to the second new drive.

FIG. 11 illustrates selection and movement of protection group members to a third new drive added to the drive subset and creation of a new protection group using the partitions freed by movement of existing protection group members to the third new drive.

FIG. 13 illustrates splitting the drive subset of FIG. 12 into two independent drive subsets.

FIG. 15 illustrates use of spares of one of the split-away drive subsets for creation of a new protection group.

FIG. 17 illustrates splitting the drive subset of FIG. 16 into two independent drive subsets with distributed spare capacity.

FIG. 18 illustrates use of spare capacity from a first drive subset for rebuilding protection group members from a second drive subset in the event of drive failure.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile storage media. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computers could operate simultaneously on one physical computer. The term "logic," if used herein, refers to special purpose physical circuit elements, firmware, software, computer instructions that are stored on a non-transitory computer-readable medium and implemented by multi-purpose tangible processors, alone or in any combination. Aspects of the inventive concepts are described as being implemented in a data storage system that includes host servers and a storage array. Such implementations should not be viewed as limiting. Those of ordinary skill in the art will recognize that there are a wide variety of implementations of the inventive concepts in view of the teachings of the present disclosure. Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
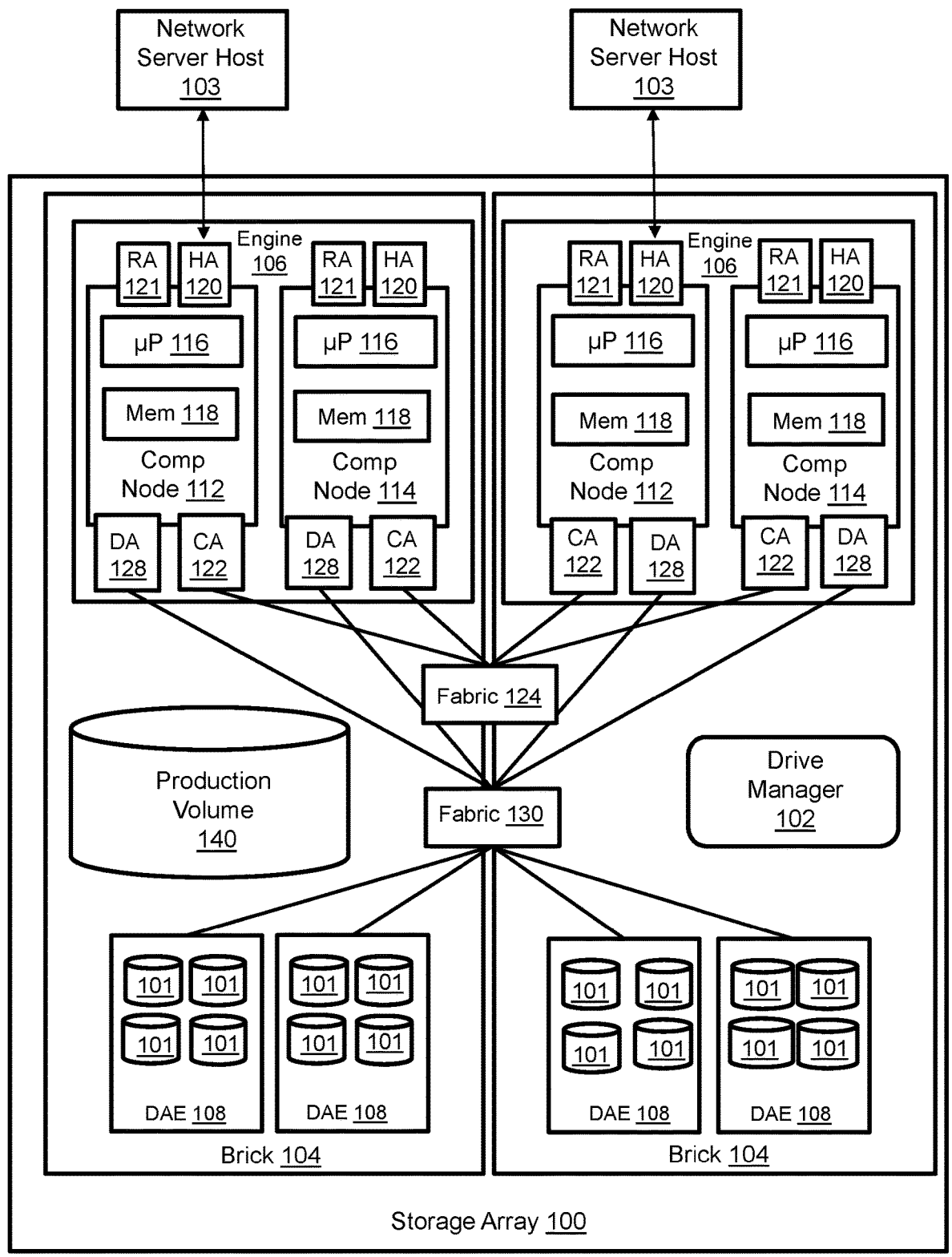
FIG. 1 illustrates a storage array with a drive manager configured to create and distribute spare capacity associated with scalable drive subsets on which protection groups are maintained.

FIG. 1 illustrates a storage array with a drive manager configured to create and distribute spare capacity associated with scalable drive subsets on which protection groups are maintained. Each drive subset managed by the drive manager 102 is scalable in single drive increments and can be split into multiple drive subsets when enough drives have been added. The storage array 100 is one example of a storage area network (SAN), which is one example of a data storage system in which the drive manager could be implemented. The storage array 100 is depicted in a simplified data center environment supporting two network server hosts 103 that run host applications. The hosts 103 include volatile memory, non-volatile storage, and one or more tangible processors. The storage array 100 includes one or more bricks 104. Each brick includes an engine 106 and one or more drive array enclosures (DAEs) 108. Each engine 106 includes a pair of interconnected compute nodes 112, 114 that are arranged in a failover relationship and may be referred to as "storage directors." Although it is known in the art to refer to the compute nodes of a SAN as "hosts," that naming convention is avoided in this disclosure to help distinguish the network server hosts 103 from the compute nodes 112, 114. Nevertheless, the host applications could run on the compute nodes, e.g. on virtual machines or in containers. Each compute node includes resources such as at least one multi-core processor 116 and local memory 118. The processor may include central processing units (CPUs), graphics processing units (GPUs), or both. The local memory 118 may include volatile media such as dynamic random-access memory (DRAM), non-volatile memory (NVM) such as storage class memory (SCM), or both. Each compute node includes one or more host adapters (HAs) 120 for communicating with the hosts 103. Each host adapter has resources for servicing input-output commands (IOs) from the hosts. The host adapter resources may include processors, volatile memory, and ports via which the hosts may access the storage array. Each compute node also includes a remote adapter (RA) 121 for communicating with other storage systems. Each compute node also includes one or more drive adapters (DAs) 128 for communicating with managed drives 101 in the DAEs 108. Each drive adapter has processors, volatile memory, and ports via which the compute node may access the DAEs for servicing IOs. Each compute node may also include one or more channel adapters (CAs) 122 for communicating with other compute nodes via an interconnecting fabric 124. The managed drives 101 include non-volatile storage media such as, without limitation, solid-state drives (SSDs) based on electrically erasable programmable read-only memory (EEPROM) technology such as NAND and NOR flash memory and hard disk drives (HDDs) with spinning disk magnetic storage media. Drive controllers may be associated with the managed drives as is known in the art. An interconnecting fabric 130 enables implementation of an N-way active-active backend. A backend connection group includes all drive adapters that can access the same drive or drives. In some implementations every drive adapter 128 in the storage array can reach every DAE via the fabric 130. Further, in some implementations every drive adapter in the storage array can access every managed drive 101.

Data associated with the hosted application instances running on the hosts 103 is maintained on the managed drives 101. The managed drives 101 are not discoverable by the hosts but the storage array creates a logical storage device referred to herein as a production volume 140 that can be discovered and accessed by the hosts. Without limitation, the production volume may also be referred to as a storage object, source device, production device, or production LUN, where the logical unit number (LUN) is a number used to identify logical storage volumes in accordance with the small computer system interface (SCSI) protocol. From the perspective of the hosts 103, the production volume 140 is a single drive having a set of contiguous fixed-size logical block addresses (LBAs) on which data used by the instances of the host application resides. However, the host application data is stored at non-contiguous addresses on various managed drives 101. The compute nodes maintain metadata that maps between the production volume 140 and the managed drives 101 in order to process IOs from the hosts.

Figure 2:
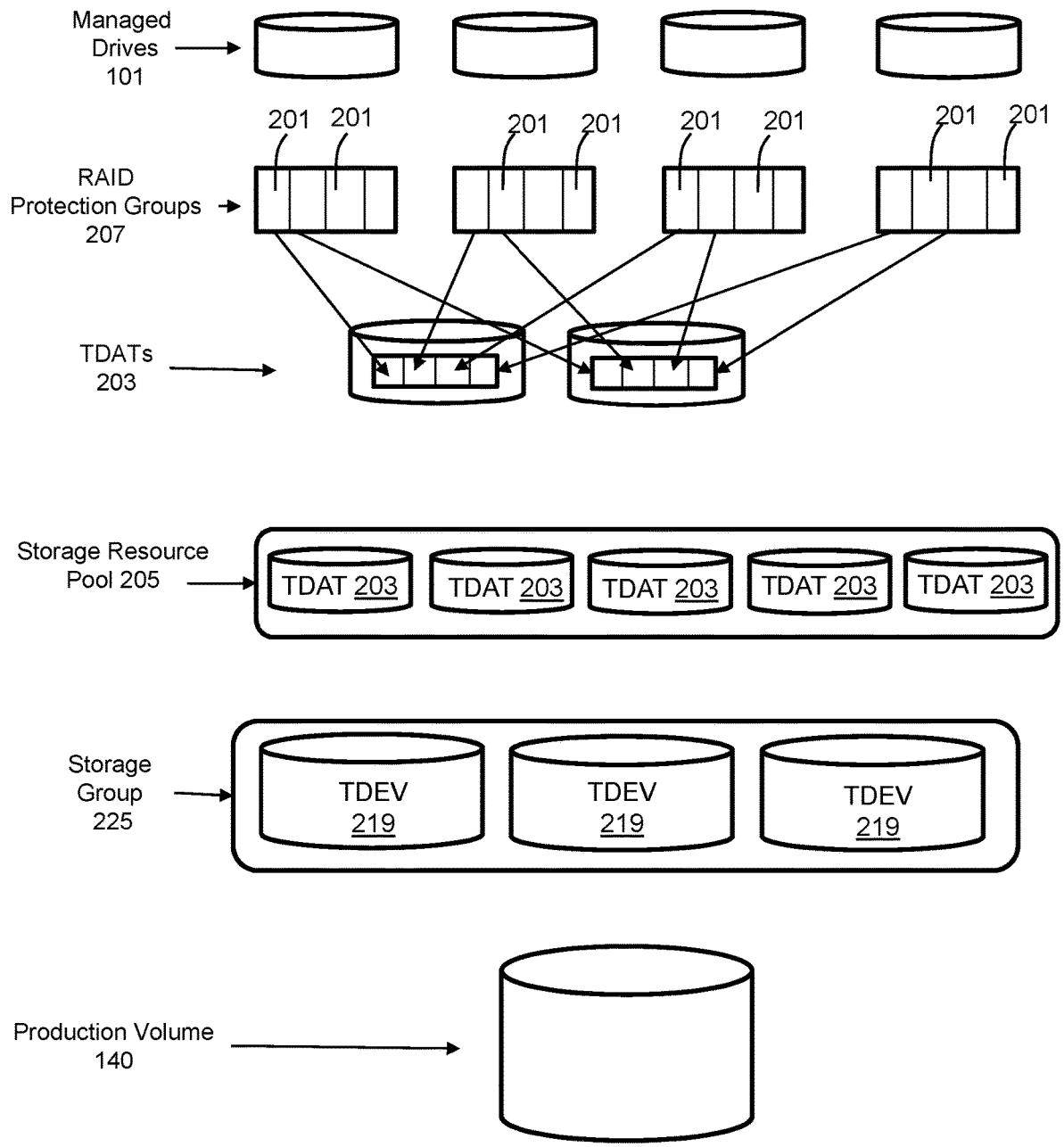
FIG. 2 illustrates layers of abstraction between the managed drives and the production volume of the storage array of FIG. 1.

FIG. 2 illustrates layers of abstraction between the managed drives 101 and the production volume 140. The smallest unit of storage capacity that can be processed by a managed drive 101 is a sector. Different types of managed drives may be characterized by different sector sizes but for context and without limitation the sector size of all managed drives may be 2 KB. IOs between the compute nodes and the managed drives may be in larger allocation units such as 128 KB tracks that are a fixed size that may be an integer multiple of the sector size. For example, an IO may read or write the sectors of a track. The managed drives 101 are each organized into partitions 201 of equal storage capacity, i.e. every partition has the same fixed size. Selection of partition storage capacity is a design implementation and, for context and without limitation, may be some fraction or percentage of the capacity of a managed drive equal to an integer multiple of sectors greater than 1. Each partition may include a contiguous range of logical addresses. Groups of partitions that include partitions from different managed drives are used to create RAID protection groups 207. The RAID protection groups are distributed on data devices (TDATs) 203. A storage resource pool 205, also known as a "data pool" or "thin pool," is a collection of TDATs 203 of the same emulation and RAID protection group type, e.g. RAID-5. In some implementations all TDATs in a drive group are of a single RAID protection group type and all have the same size (storage capacity). Logical thin devices (TDEVs) 219 are created using TDATs. The TDATs and TDEVs are accessed using tracks as the allocation unit. Multiple TDEVs 219 are organized into a storage group 225. The production volume 140 is created from a single storage group 225. Host application data, which is stored in blocks on the production volume 140, is mapped to tracks of the TDEVs, which map to sectors of the managed drives. Regardless of the specific allocation unit capacities selected, a track is larger than both the sectors and the fixed size blocks used in communications between the storage array and the hosts to access the production volume.

Figure 3:
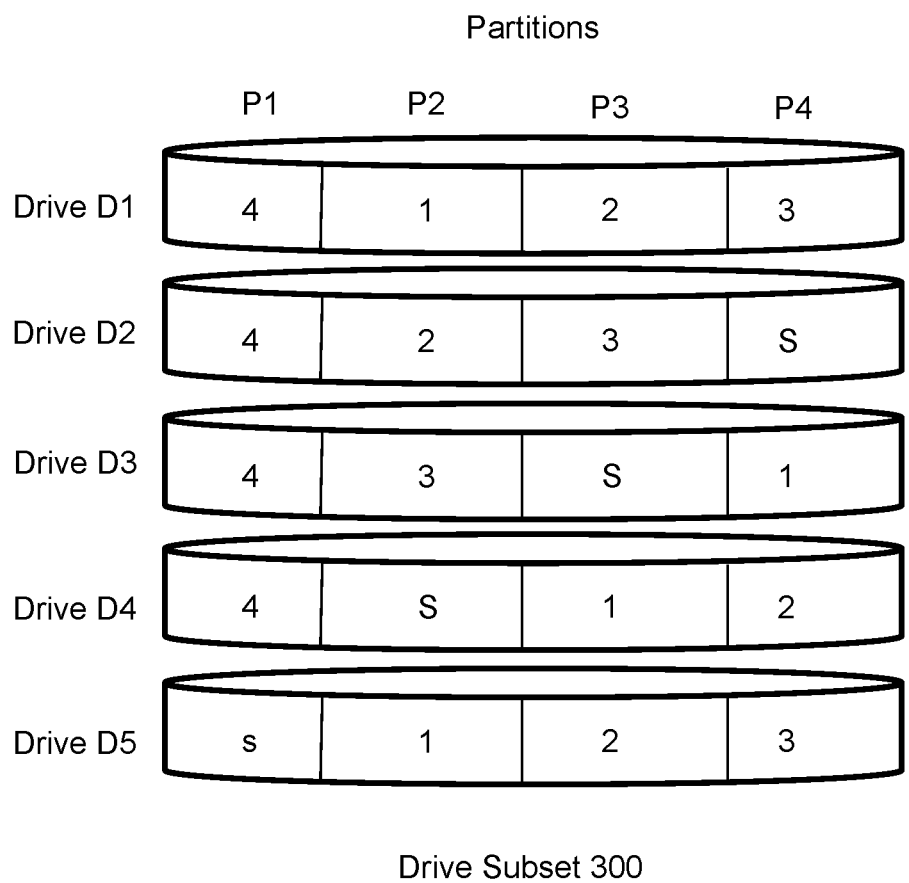
FIG. 3 illustrates creation of an initial drive subset of (W+1) drives on which RAID (D+P) protections groups are maintained.

FIG. 3 illustrates an implementation of RAID (D+P) protections groups on a subset 300 of the managed drives 101 (FIG. 1). In the present disclosure W=(D+P) by definition. The storage array includes multiple drive subsets such as drive subset 300, each of which is created with W or (W+1) drives and W partitions. Using (W+1) drives provides spare capacity for use in response to drive failure. RAID (3+1) is implemented in the illustrated example and the drive subset includes (W+1) drives so there are five drives D1-D5 and four partition indexes P1-P4. For purposes of explanation all of the drives have the same storage capacity and all of the partitions have the same fixed size in terms of storage capacity. In accordance with RAID requirements, protection group members are located in the drive partitions such that no more than one member of a protection group is located on the same drive. Protection groups 1-4 represent data and/or parity members. The protection group members and spare capacity partitions S are distributed within the drive subset in a manner that facilitates failover and scaling as will be described below.

FIG. 4 is a matrix representation of the drive subset of FIG. 3. Rows 1-5 in the matrix represent drives D1-D5 and columns 1-4 in the matrix represent partitions P1-P4. Initially, a single protection group 4 is created in the lowest numbered partition index of the W lowest numbered drives. In the illustrated example W=4 so protection group 4 members are located in partition 1 of drives 1-4. Spares at drive X partition index Y satisfy the equation X+Y=W+2. Additional protection groups are created, and their members symmetrically distributed in the remaining free partitions such that the RAID member at drive X partition index Y belongs to RAID group N where:

a. If $(X+Y)<(W+2)$, then $N=(X+Y-2)$; and
b. If $(X+Y)>(W+2)$, then $N=(X+Y-W-2)$.

In the illustrated example W=4 and a spare partition S is located at partition index P1 of drive D1 because $(X+Y)=(5+1)=(4+2)$. A member of protection group 2 is located at partition index 3 of drive D1 because $(X+Y)=(1+3)=(2+2)=(N+2)$. The resulting distribution of spare partitions S is along a diagonal of the matrix with adjacent spare partitions located on incrementally decreasing drive numbers and incrementally increasing partitions. Apart from the single partition protection group 4, the protection groups are symmetrically distributed. In contrast, it is typical in previous designs for protection group members to be located on single partitions and all spare capacity to be on a spare drive.

Figure 5:
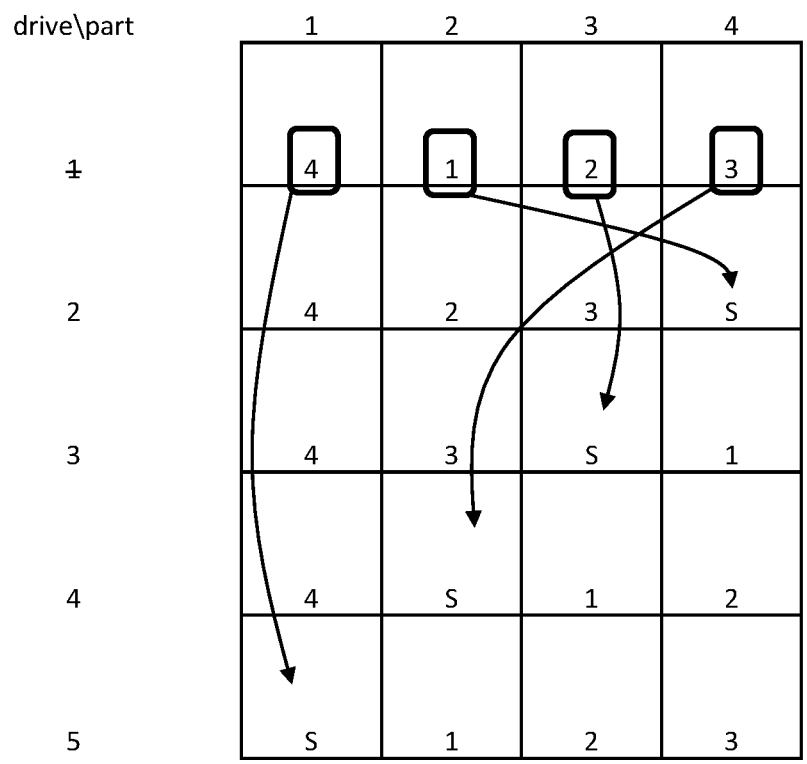

FIGS. 5 and 6 illustrate use of spare partitions in response to drive failure in the drive subset represented by FIG. 4. In the illustrated example drive 1 fails or is failing so the protection group members 4, 1, 2, 3 on partitions 1-4 of drive 1 must be relocated or rebuilt. The protection group members are relocated or rebuilt in the spare partitions S such that no more than one member of a protection group is located on the same drive. The distributions of the protection group members and spare partitions assures that at least one solution is available such no more than one member of a protection group is located on the same drive. If multiple solutions are available, then any one of those solutions may be implemented. In the illustrated example the member of protection group 4 at partition 1 of drive 1 is relocated or rebuilt in partition 1 of drive 1, the member of protection group 1 at partition 2 of drive 1 is relocated or rebuilt in partition 4 of drive 2, the member of protection group 2 at partition 3 of drive 1 is relocated or rebuilt in partition 3 of drive 3, and the member of protection group 3 at partition 4 of drive 1 is relocated or rebuilt in partition 2 of drive 4. The failed drive is removed from service and may eventually be replaced. Following replacement of the failed drive the relocated protection group members may be returned to their original drive and partition locations, thereby restoring the diagonally distributed spare partitions.

Figure 7:
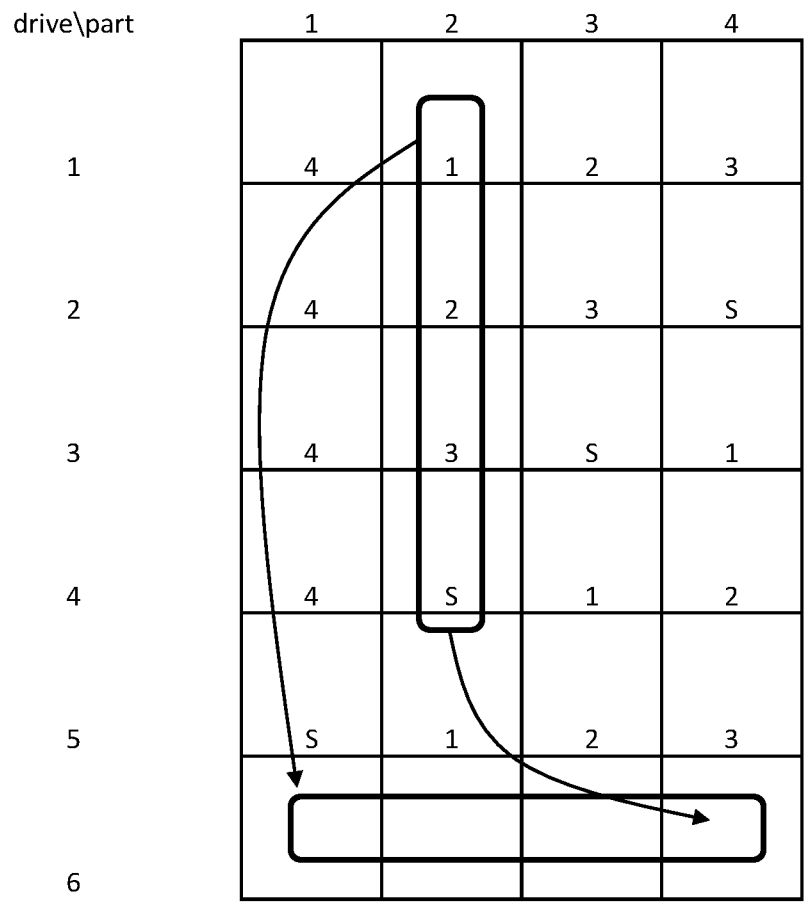

FIGS. 7 and 8 illustrate selection and movement of protection group members to a first new drive added to the drive subset represented by FIG. 4. The first new drive is sequentially numbered relative to existing drives 1-5 and is thus drive 6. The new drive is formatted with the same number and size partitions as the existing drives and thus has W partitions numbered 1-4. A new drive is populated using a rotation technique in which a vertical column of partitions is "rotated" to a horizontal row of partitions on a new drive. In the illustrated example the W protection group members in the lowest numbered unrotated partition, excluding the single partition protection group initially created in the lowest numbered partition, are rotated from the first W drives in ascending order to the W partitions of the new drive in ascending order. For example, the protection group member on the first drive is moved to the first partition of the new drive, the protection group member on the second drive is moved to the second partition of the new drive, the protection group member on the third drive is moved to the third partition of the new drive, and so forth. Consequently, the drive number from which the member is moved becomes the partition number to which the member is moved. In the illustrated example W=4, protection group 4 is excluded, and none of the partitions have been rotated so partition 2 of drives 1-4 is rotated onto new drive 6. Specifically, protection group member 1 is moved from drive 1, partition 2 to drive 6, partition 1, protection group member 2 is moved from drive 2, partition 2 to drive 6, partition 2, protection group member 3 is moved from drive 3, partition 2 to drive 6, partition 3, and the spare protection group member S is moved from drive 4, partition 2 to drive 6, partition 4. In order to maintain the original distribution of spares a new spare partition S is created at partition 2 of drive 4.

FIG. 9 illustrates creation of a new protection group using the partitions freed by movement of existing protection group members to the first new drive. The new protection group is sequentially numbered relative to the existing protection groups and includes the same number of members, i.e. W. In the illustrated example the new protection group is assigned the number 5 because the existing protection groups are numbered 1-4. The members of protection group 5 are located in the partitions that were made available by the rotation of protection group members 1, 2, 3 in partition 2 of drives 1-3. The rotated spare partition S at partition 4 of drive 6 is utilized for the fourth member of protection group 5 in order to maintain the original distribution of the spare partitions S.

FIG. 10 illustrates selection and movement of protection group members to a second new drive added to the drive subset and creation of a new protection group using the partitions freed by movement of existing protection group members to the second new drive. The second new drive is sequentially numbered relative to existing drives 1-6 and is thus drive 7. The W protection group members in the lowest numbered unrotated partition, excluding the single partition protection group initially created in the lowest numbered partition, are in partition 3 of drives 1-4 so those members and the spare 2, 3, S, 1 are rotated to new drive 7. The new protection group is assigned the number 6 because the existing protection groups are numbered 1-5. The members of protection group 6 are located in the partitions that were made available by the rotation of protection group members 2, 3, 1 in partition 3 of drives 1, 2 and 4. The rotated spare partition S at partition 3 of drive 7 is utilized for the fourth member of protection group 6 in order to maintain the original distribution of the spare partitions S.

FIG. 11 illustrates selection and movement of protection group members to a third new drive added to the drive subset and creation of a new protection group using the partitions freed by movement of existing protection group members to the third new drive. The third new drive is sequentially numbered relative to existing drives 1-7 and is thus drive 8. The W protection group members in the lowest numbered unrotated partition, excluding the single partition protection group initially created in the lowest numbered partition, are in partition 5 of drives 1-4 so those members and the spare 3, S, 1, 2 are rotated to new drive 8. The new protection group is assigned the number 7 because the existing protection groups are numbered 1-6. The members of protection group 7 are located in the partitions that were made available by the rotation of protection group members 3, 1, 2 in partition 4 of drives 1, 3 and 4. The rotated spare partition S at partition 2 of drive 8 is utilized for the fourth member of protection group 7 in order to maintain the original distribution of the spare partitions S.

Figure 12:
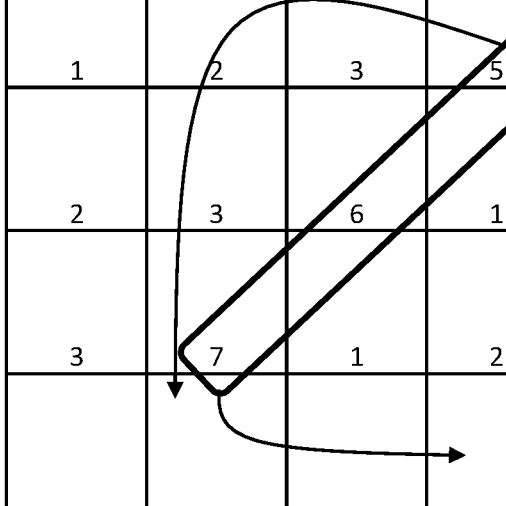
FIG. 12 illustrates selection and movement of protection group members to a fourth new drive added to the drive subset.

FIG. 12 illustrates selection and movement of protection group members to a fourth new drive added to the drive subset. The fourth new drive is designated as drive 9. All of the partitions are excluded or already rotated so protection group members located on a diagonal starting with partition 1 of drive 9 with adjacent partitions located on incrementally decreasing drive numbers and incrementally increasing partitions are selected for rotation. In the illustrated example protection group members 5, 6, 7 are rotated into partitions 2, 3, 4 of drive 9. The rotation and resulting vacated diagonal partitions help to prepare for a split.

FIG. 13 illustrates splitting the drive subset of FIG. 12 into two independent drive subsets 350, 352. The first drive subset 350 includes drives 1, 2, 3, 4, and 9. The second drive subset 352 includes drives 5, 6, 7, and 8. Spare partitions S are created in the vacated partitions. The drive subsets are independent because they are managed separately, and all of the members of each protection group reside on only one drive subset.

Figure 14:
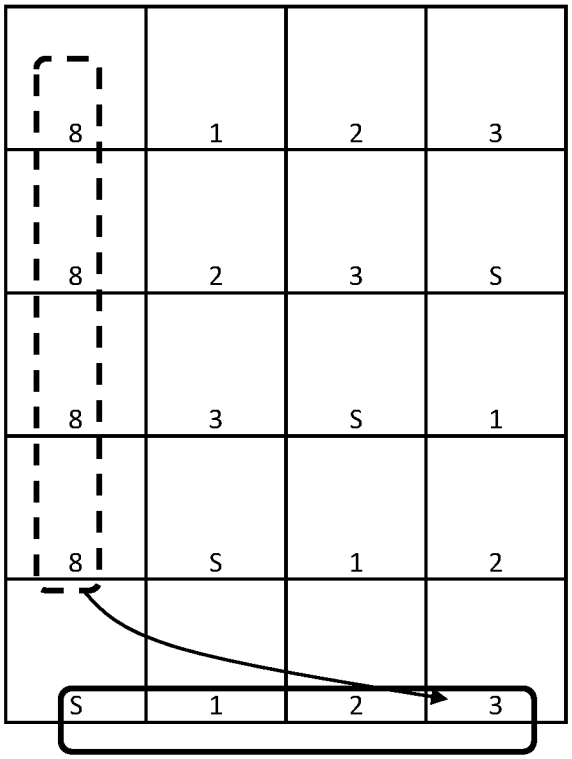
FIG. 14 illustrates selection and movement of protection group members to distribute spares and configure one of the split-away drive subsets for scaling.

FIG. 14 illustrates selection and movement of protection group members of drive subset 352 to distribute spares and prepare for scaling. A new drive 10 is added to the drive subset. The W members in the lowest numbered partition of the W lowest numbered drives are rotated onto the new drive 10. As a result of rotation, the spare partition S is relocated from partition 1 of drive 5 to partition 1 of drive 10, thereby creating the distribution of spares S along the diagonal as was done in the original drive subset. A new protection group 8 is created in the partitions vacated due to the rotation, thereby recreating the single partition protection group, diagonally distributed spares, and symmetrically distributed protection group members of the original drive subset.

FIG. 15 illustrates use of spares of drive subset 352 for creation of a new protection group. Rather than adding a new drive and redistributing protection group members and spares as described above the four spare partitions S are used to create a new protection group 8. This variation may be used when the split-away drive subset does not need spare capacity and will not be scaled.

Figure 16:
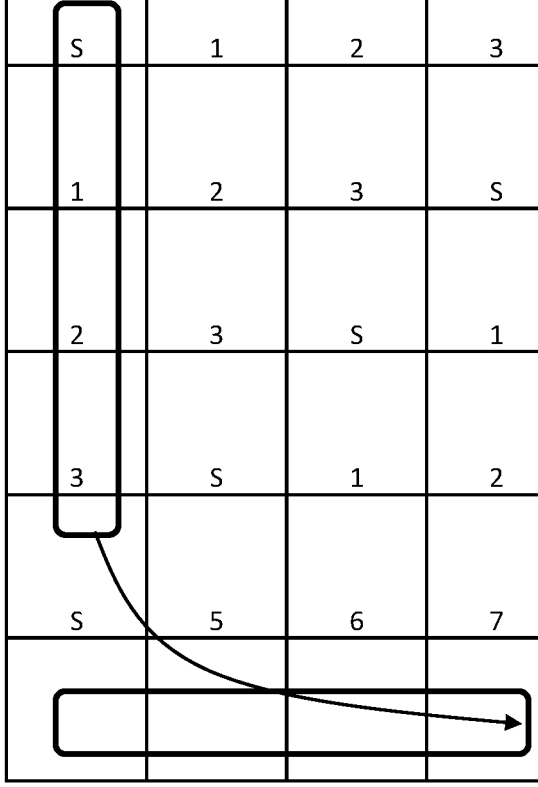
FIG. 16 illustrates selection and movement of protection group members to a fifth new drive added to the drive subset of FIG. 12.

FIG. 16 illustrates selection and movement of protection group members to a fifth new drive added to the drive subset of FIG. 12. The fifth new drive is designated as drive 10. W protection group members in the lowest numbered partition, excluding the members of the single partition protection group initially created in the lowest numbered partition, are rotated onto the new drive. In the illustrated example S, 1, 2, 3 in partition 1 of drives 5-8 are rotated to partitions 1-4 of new drive 10. A spare partition S is created at partition 1 of drive 5 to maintain the original diagonally distributed spares. are in partition 5 of drives 1-4 so those members and the spare 3, S, 1, 2 are rotated to new drive 8. The new protection group is assigned the number 7 because the existing protection groups are numbered 1-6. The members of protection group 7 are located in the partitions that were made available by the rotation of protection group members 3, 1, 2 in partition 4 of drives 1, 3 and 4. The rotated spare partition S at partition 2 of drive 8 is utilized for the fourth member of protection group 7 in order to maintain the original distribution of the spare partitions S. A new protection group 8 may be created using the vacated locations at partition 1 of drives 5-8.

FIG. 17 illustrates splitting the drive subset of FIG. 16 into two independent drive subsets 360, 362 with distributed spare capacity. Drive subset 360 is created using drives 1, 2, 3, 4, and 9. Drive subset 362 is created using drives 5, 6, 7, 8, and 10. Drive subset 362 is pre-configured for scaling and use of spare capacity because a single partition protection group is located in partition 1, spare partitions S are distributed along a diagonal, and the other protection group members are symmetrically distributed. In other words, drive subset 362 is organized in the same way as the original drive subset. Drive subset 360 may be maintained in the illustrated form, reconfigured in the same way as the original drive subset, or used to create an additional protection group by using the spare partitions.

FIG. 18 illustrates use of spare capacity from a first drive subset for rebuilding protection group members from a second drive subset in the event of drive failure. Drive subset 364 is organized in the same way as the original drive subset including W spare partitions. Drive subset 366 has no spare partitions. This situation may occur when a drive subset is split and only one of the split-away drive subsets includes spares, e.g. because there were no spares at the time of the split or because spares were used to create a new protection group. When one of the drives of the subset 366 that lacks spare capacity fails, the protection group members are rebuilt using the spare partitions of the drive subset 364 that has spare capacity. This results in distribution of members of protection groups on multiple drive subsets, e.g. members of protection group 8 are on drive subset 364 and drive subset 366. However, when the failed drive 5 is replaced the protection group members in the spare partitions S of drive subset 364 are relocated to the replaced drive 5 in drive subset 366.

Figure 19:
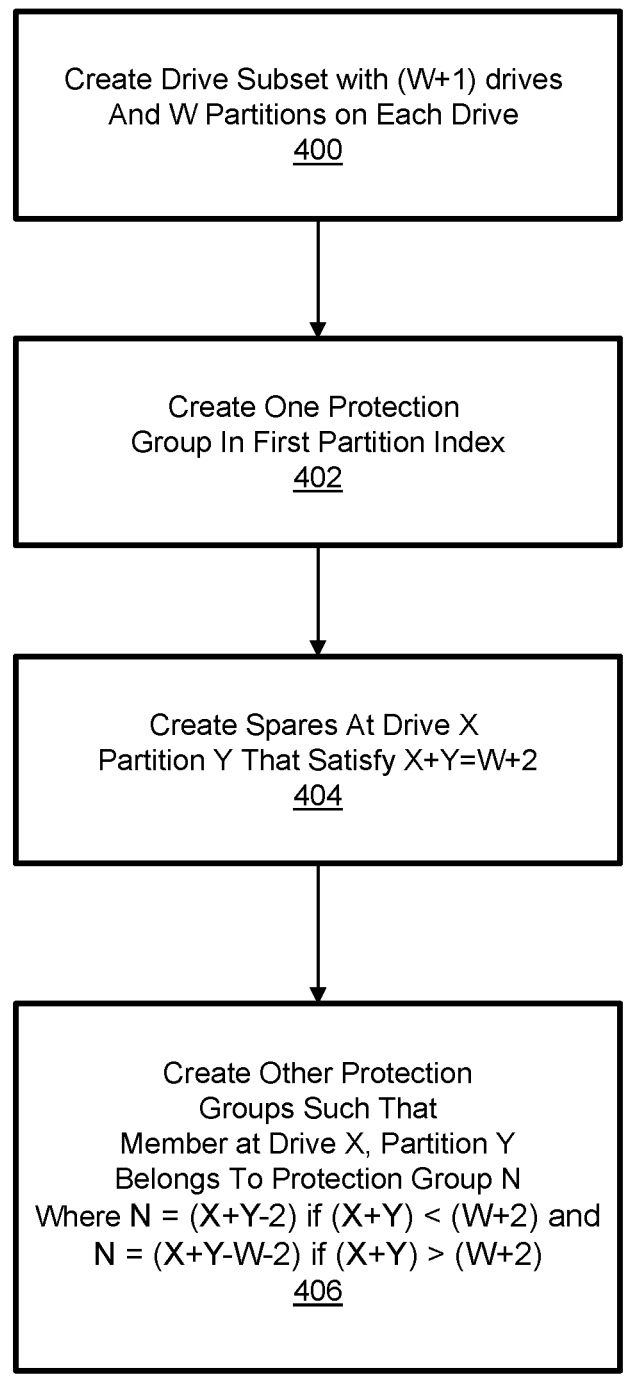
FIG. 19 illustrates steps associated with creation of an initial drive subset of (W+1) drives on which RAID (D+P) protections groups are maintained.

FIG. 19 illustrates steps associated with creation of an initial drive subset of (W+1) drives on which RAID (D+P) protections groups are maintained. Step 400 is creating W partitions on each drive of a drive subset of (W+1) drives. Step 402 is creating one protection group in the first partition index of the drive subset. The drives and partitions in the drive subset are sequentially ordered, e.g. using numbers. The first partition may be the lowest numbered partition. The protection group, which includes W members, is created in lowest numbered partition of the W lowest numbered drives. Step 404 is creating distributed spares. Spares at drive X partition index Y satisfy the equation X+Y=W+2. The result is a diagonal distribution of spare partitions. Step 406 is creating additional sequentially numbered protection groups. Additional protection groups are created, and their members symmetrically distributed in the remaining free partitions such that the RAID member at drive X partition index Y belongs to RAID group N where:
a. If (X+Y)<(W+2), then N=(X+Y−2); and
b. If (X+Y)>(W+2), then N=(X+Y−W−2). The resulting drive subset is configured for scaling and use of spare capacity.

Figure 20:
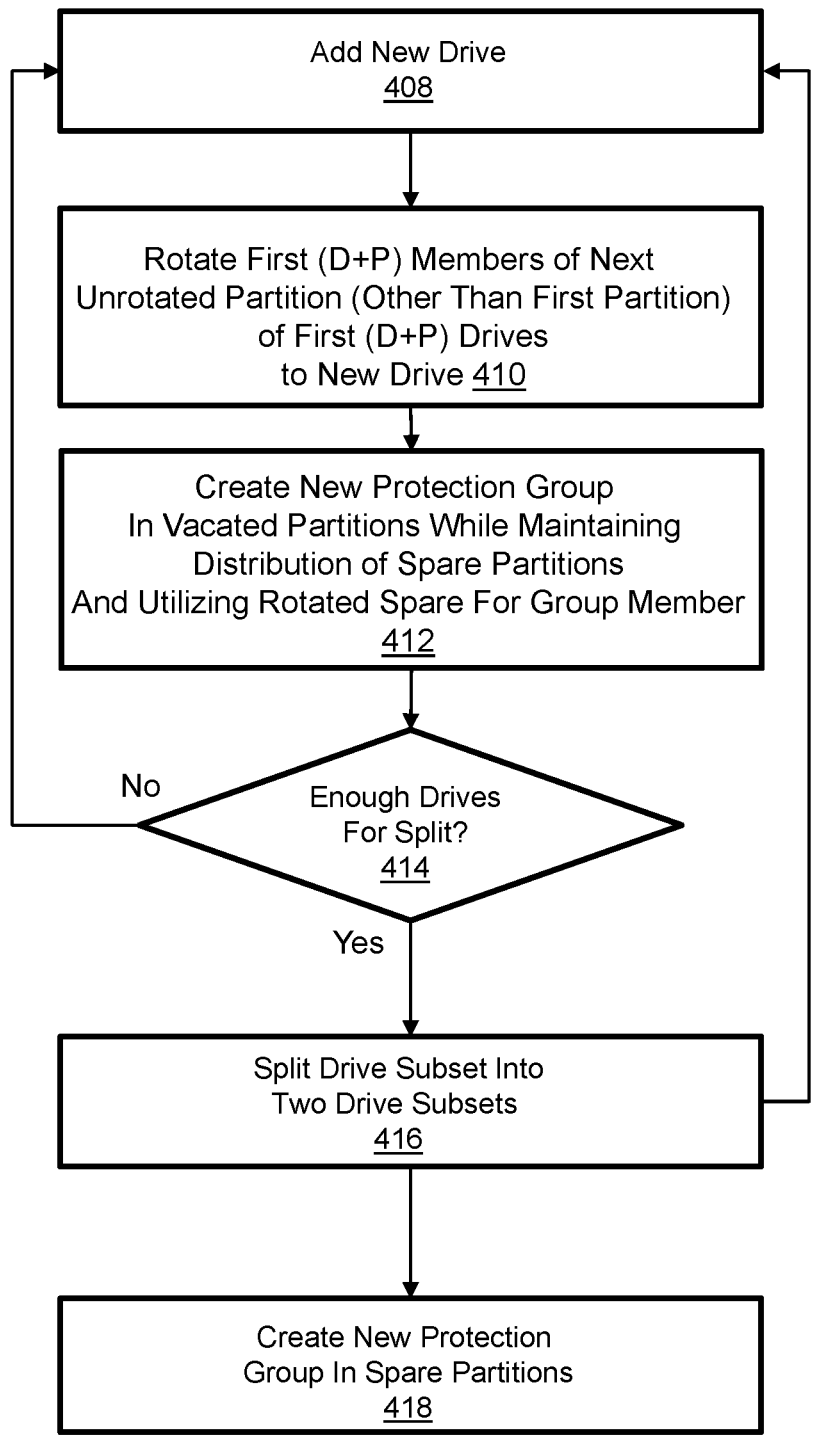
FIG. 20 illustrates steps associated with creation and distribution of spare capacity associated with scalable drive subsets on which protection groups are maintained.

FIG. 20 illustrates steps associated with creation and distribution of spare capacity associated with scalable drive subsets on which protection groups are maintained such as the drive subset created using the steps shown in FIG. 19.

Step 408 is adding a new drive to the drive subset. Step 410 is rotating the first W protection group members in the lowest numbered unrotated partition. The single partition protection group initially created in the lowest numbered partition is excluded from consideration. The selected protection group members, including spares, are rotated from the first W drives in ascending order to the W partitions of the new drive in ascending order. For example, for the first new drive the protection group member on the first drive is moved to the first partition of the first new drive, the protection group member on the second drive is moved to the second partition of the first new drive, etc. Consequently, the drive number from which the member is moved becomes the partition number to which the member is moved. Step 412 is creating a new protection group using the partitions that were vacated due to rotation of protection group members. A new spare partition is created in place of a rotated spare in order to maintain the desired distribution of spare capacity, so a member of the new protection group is not located in place of the vacated spare. Rather, that extra new protection group member is located in the rotated spare, i.e. the spare location on the new drive. If there are enough drives in the drive subset for a split as determined in step 414 then the drive subset is split into two drive subsets as indicated in step 416. Otherwise steps 408 through 414 may be iterated, e.g. scaling the drive subset in single drive increments until a split becomes possible. The number of drives required for a split is in part a design decision. For example, an original drive subset with 2*W drives could be split into two drive subsets of W drives or the original drive subset may be maintained until there are 2*W+1 drives or 2*(D+P+1) drives, depending on whether maintenance of spare capacity in one or both split-away drive subsets is desired. Further, the drive subset may be split-away such that one of the new drive subsets is preconfigured with a single partition protection group, diagonally distributed spares, and symmetrically distributed protection group members or reconfigured after being split away. When suitably configured a split-away drive subset may be scaled and split by repeating steps 408 through 414. Optionally, one or more new protection groups may be created using spare partitions as indicated in step 418.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method of creating and distributing spare capacity on a scalable drive subset on which protection groups are maintained, comprising:
creating W=(D+P) partitions that are equal in size and number on (W+1) drives, wherein the partitions are sequentially ordered, and the drives are sequentially ordered;
creating a first vertical protection group that has D data members and P parity members in one partition of W of the drives;
creating spares at drive X partition Y that satisfy X+Y=W+2; and
symmetrically distributing members of additional protection groups with W members on remaining partitions;

whereby the spares are distributed such that all protection group members on a failed one of the drives can be relocated to ones of the spares such that no more than one member of any of the protection groups is located on a single one of the drives.

2. The method of claim 1 comprising symmetrically distributing members of additional protection groups such that the protection group member at drive X partition index Y belongs to protection group N, where if $(X+Y)<(W+2)$, then $N=(X+Y-2)$.

3. The method of claim 1 comprising symmetrically distributing members of additional protection groups such that the protection group member at drive X partition index Y belongs to protection group N, where if $(X+Y)>(W+2)$, then $N=(X+Y-W-2)$.

4. The method of claim 1 comprising creating the first protection group in a lowest numbered partition of the W lowest numbered drives.

5. The method of claim 1 comprising scaling the drive subset by adding new drives in single drive increments.

6. The method of claim 5 comprising, responsive to addition of a new drive, rotating the first W protection group members in the lowest numbered unrotated partition, excluding members of the vertical protection group, onto the new drive.

7. The method of claim 6 comprising utilizing partitions vacated by rotated protection group members and a rotated spare to create a new protection group.

8. An apparatus, comprising:
a plurality of non-volatile drives;
a plurality of interconnected compute nodes that manage access to the drives; and
a drive manager comprising program code on a non-transitory, computer-readable medium, the drive manager configured to:
create $W=(D+P)$ partitions that are equal in size and number on $(W+1)$ drives, wherein the partitions are sequentially ordered, and the drives are sequentially ordered;
create a first vertical protection group that has D data members and P parity members in one partition of W of the drives;
create spares at drive X partition Y that satisfy $X+Y=W+2$; and
symmetrically distribute members of additional protection groups with W members on remaining partitions;
whereby the spares are distributed such that all protection group members on a failed one of the drives can be relocated to ones of the spares such that no more than one member of any of the protection groups is located on a single one of the drives.

9. The apparatus of claim 8 wherein the drive manager distributes members of additional protection groups such that the protection group member at drive X partition index Y belongs to protection group N, where if $(X+Y)<(W+2)$, then $N=(X+Y-2)$.

10. The apparatus of claim 8 wherein the drive manager symmetrically distributes members of additional protection groups such that the protection group member at drive X partition index Y belongs to protection group N, where if $(X+Y)>(W+2)$, then $N=(X+Y-W-2)$.

11. The apparatus of claim 8 wherein the drive manager creates the first protection group in a lowest numbered partition of the W lowest numbered drives.

12. The apparatus of claim 8 wherein the drive subset is scaled by adding new drives in single drive increments and wherein the drive manager is configured to rotate the first W protection group members in the lowest numbered unrotated partition, excluding members of the vertical protection group, onto a new drive.

13. The apparatus of claim 12 wherein the drive manager is configured to utilize partitions vacated by rotated protection group members and a rotated spare to create a new protection group.

14. A non-transitory computer-readable storage medium storing instructions that when executed by a computer cause the computer to perform a method for using a computer system to create and distribute spare capacity on a scalable drive subset on which protection groups are maintained, the method comprising:
creating $W=(D+P)$ partitions that are equal in size and number on $(W+1)$ drives, wherein the partitions are sequentially ordered, and the drives are sequentially ordered;
creating a first vertical protection group that has D data members and P parity members in one partition of W of the drives;
creating spares at drive X partition Y that satisfy $X+Y=W+2$; and
symmetrically distributing members of additional protection groups with W members on remaining partitions;
whereby the spares are distributed such that all protection group members on a failed one of the drives can be relocated to ones of the spares such that no more than one member of any of the protection groups is located on a single one of the drives.

15. The non-transitory computer-readable storage medium of claim 14 wherein the method further comprises symmetrically distributing members of additional protection groups such that the protection group member at drive X partition index Y belongs to protection group N, where if $(X+Y)<(W+2)$, then $N=(X+Y-2)$.

16. The non-transitory computer-readable storage medium of claim 14 wherein the method further comprises symmetrically distributing members of additional protection groups such that the protection group member at drive X partition index Y belongs to protection group N, where if $(X+Y)>(W+2)$, then $N=(X+Y-W-2)$.

17. The non-transitory computer-readable storage medium of claim 14 wherein the method further comprises creating the first protection group in a lowest numbered partition of the W lowest numbered drives.

18. The non-transitory computer-readable storage medium of claim 14 wherein the method further comprises scaling the drive subset by adding new drives in single drive increments.

19. The non-transitory computer-readable storage medium of claim 18 wherein the method further comprises, responsive to addition of a new drive, rotating the first W protection group members in the lowest numbered unrotated partition, excluding members of the vertical protection group, onto the new drive.

20. The non-transitory computer-readable storage medium of claim 19 wherein the method further comprises utilizing partitions vacated by rotated protection group members and a rotated spare to create a new protection group.

* * * * *